United States Patent [19]
Ban et al.

[11] 3,981,147
[45] Sept. 21, 1976

[54] MASTER CYLINDER ASSEMBLY

[75] Inventors: Masashi Ban, Kariya; Masakazu Ishikawa; Hiroshi Uemura, both of Toyota, all of Japan

[73] Assignees: Aisin Seiki Kabushiki Kaisha, Kariya; Toyota Jidosha Kogyo Kabushiki Kaisha, Toyota, both of Japan

[22] Filed: Aug. 1, 1975

[21] Appl. No.: 600,956

[30] Foreign Application Priority Data
Sept. 25, 1974 Japan.............................. 49-115975

[52] U.S. Cl.................................. 60/585; 285/206
[51] Int. Cl.²........................................... F15B 7/08
[58] Field of Search...................... 60/581, 585, 592; 285/206, 321

[56] References Cited
UNITED STATES PATENTS

| | | | |
|---|---|---|---|
| 780,797 | 1/1905 | Hoeregott et al.................. | 285/206 |
| 3,113,433 | 12/1963 | Kohlman........................... | 60/581 X |
| 3,479,068 | 11/1969 | Brittain............................ | 60/585 X |
| 3,545,206 | 12/1970 | Belart............................... | 60/581 |
| 3,609,975 | 10/1971 | Lewis et al....................... | 60/592 X |
| 3,886,747 | 6/1975 | Hardwick et al. ................ | 60/585 |

FOREIGN PATENTS OR APPLICATIONS

| | | | |
|---|---|---|---|
| 531,004 | 10/1956 | Canada............................. | 285/321 |
| 1,024,596 | 3/1966 | United Kingdom................ | 60/585 |
| 1,120,068 | 7/1968 | United Kingdom................ | 60/585 |

*Primary Examiner*—Martin P. Schwadron
*Assistant Examiner*—H. Burks, Sr.
*Attorney, Agent, or Firm*—Finnegan, Henderson, Farabow & Garrett

[57] ABSTRACT

In a combined reservoir made of a plastic material such as nylon or polythene and master cylinder housing assembly, a bolt is screwed into coaxial openings of the housing and the reservoir to fasten each other. A metallic sleeve is secured to the opening of the plastic reservoir to limit the compression of plastic reservoir when the bolt is rotated. Thus, a seal rubber provided between the plastic reservoir and the housing is properly compressed to make effectively fluid-tight therebetween due to a proper fastening force exerted on the metallic sleeve.

8 Claims, 1 Drawing Figure

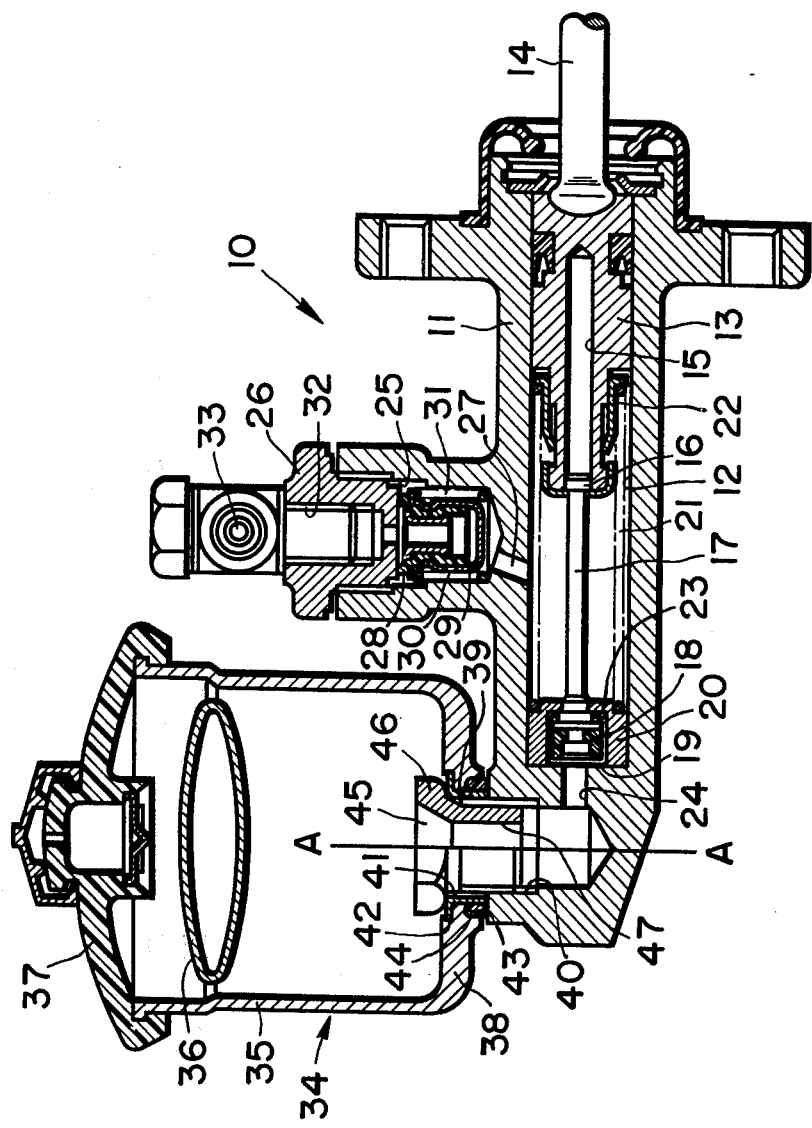

3,981,147

MASTER CYLINDER ASSEMBLY

BACKGROUND OF THE INVENTION

The present invention relates to a master cylinder assembly having a plastic reservoir, and more particularly to the master cylinder assembly with connecting means between a master cylinder housing and the plastic reservoir thereof.

The reservoir tank for containing the working fluid of a hydraulically operated brake system or clutch is generally made of plastic material such as nylon or polythene. The problem arises when the plastic reservoir is fixed to a metallic housing of the master cylinder assembly, because a bottom portion of plastic reservoir is deformed and the sealing between the plastic reservoir and the metallic housing of the master cylinder assembly is not ensured completely.

More particularly, the plastic reservoir tank is conventionally provided with an axial opening through which a bolt is passed so as to screw it into the master cylinder housing. The rotation of the bolt causes the bottom wall of the reservoir to be excessively compressed between a head of the bolt and the master cylinder housing. The rotation of the bolt also causes the seal member interposed between the reservoir and the master cylinder housing to be undesirably compressed. It is hard in practice to get a force proper to tighten the seal member because of the resiliency of the plastic material.

In order to obviate such a difficulty, improvement has been presented, which inserts the metallic washer or gasket into the axial opening of the plastic reservoir.

The above-mentioned improvement is disclosed in U.S. Pat. No. 3,427,807 to Moyes. This prior art is such constructed that the cylindrical sleeve is inserted into the opening in the thickened bottom wall of the reservoir and washer is interposed between a head of the bolt and an inner surface of said bottom wall, thereby preventing the excessive deformation of the bottom wall and making a connection portion of the reservoir and the housing of the master cylinder fluid-tight completely. When the sleeve is located exactly in the opening, the above functions are provided. However, when the sleeve is not fitted in the proper position in said opening, the bottom portion of the reservoir and the rubber seal are undesirably deformed so as not to remain fluid-tight under the usual condition. This means that the prior art is complicate in manufacture.

SUMMARY OF THE INVENTION

Therefore, it is an object of this invention to provide a master cylinder assembly combined with a plastic reservoir which can overcome the conventional drawbacks.

It is another object of this invention to provide a master cylinder assembly combined with a plastic reservoir wherein a proper tightening force is applied to a seal member between the master cylinder assembly and the plastic reservoir through suitable connecting means.

It is a further object of this invention to provide a master cylinder assembly combined with a plastic reservoir which is easy in combining the master cylinder assembly and the plastic reservoir, simple in construction, and inexpensive to manufacture.

Other objects and advantages of this invention will be appreciated by referring to the following description, taken in conjunction with the accompanying drawing.

According to this invention, briefly summarized, a cylindrical body of a metallic sleeve is secured to an inside opening of the plastic reservoir and a radial flange thereof is interposed between the master cylinder housing and a bolt head. The rotation of the bolt causes the compression of the bottom wall of plastic reservoir between the bolt head and the master cylinder housing, to thereby fix the plastic reservoir to the master cylinder housing. Simultaneously, the seal member is also properly compressed between the bottom wall of plastic reservoir and the master cylinder housing, to thereby effect sealings therebetween.

BRIEF DESCRIPTION OF THE DRAWING

In the accompanying drawing, the sole FIGURE is a diagrammatic illustration of one embodiment of a master cylinder assembly combined with a plastic reservoir according to the present invention.

DETAILED EXPLANATION OF THE PREFERRED EMBODIMENT

Referring now to the sole FIGURE wherein a preferred embodiment of the present invention is illustrated, a master cylinder assembly for brakes or clutches is generally indicated by reference numeral 10. The master cylinder assembly 10 comprises a housing 11 which is fixed to a vehicle body (not shown) by suitable means such as bolts (not shown). The housing 11 includes an axial bore 12 within which a piston 13 is slidably disposed. The piston 13 is mechanically connected to a push rod 14 operable by a foot pedal (not shown) or a booster of brake system and is provided with an axial passage 15 therein so as to slidably receive an end head 16 of a plunger 17. The plunger 17 is provided at its other end with a rubber valve 18 which is axially spaced away from an inside end wall 19 of housing 11 when the piston 13 is not moved. A cage 20 is normally abutted on the inside end wall 19 by a compression spring 21 which is rested on a retainer 22 securely mounted on the piston 13.

A helical spring 23 is interposed between the cage 20 and the rubber valve 18 to urge the rubber valve 18 to displace toward the inside end wall 19. The spring force of the compression spring 21 is stronger than that of the helical spring 23 so that the rubber valve 18 is kept in the illustrated position as far as the piston 13 is not moved, as described above. However, when the piston 13 is shifted to the left the rubber valve 18 is also moved to the left by exerting force of the helical spring 23 to close an inlet port 24 provided at the inside end wall 19. It is to be noted that the plunger 17 is slidable with respect to the cage 20.

The housing 11 of the master cylinder assembly 10 also comprises an outlet bore 25 in which a plug 26 is securely fitted, and an outlet port 27 for fluidically communicating the axial bore 12 with the outlet bore 25.

Within the outlet bore 25 are provided a tubular rubber 28 fixed to the plug 26, a cylindrical metal 29 provided with a plurality of through-holes 30 to be closed by a free end portion of the tubular rubber 28, and a coil spring 31 for rigidly mounting the cylindrical metal 29 onto the tubular rubber 28. The plug 26 is provided with an inner axial passage 32 and an outlet opening 33 fluidically communicated with wheel brake cylinders or clutch assembly (not shown). The purpose and function of such a construction is to remain some residual fluid pressure in the wheel brake cylinders or clutch assembly even after the foot depression is released. More specifically, when the piston 13 is moved to the left, the inlet port 24 is closed by the rubber valve 18 of plunger 17 and the fluid in the bore 12 is pressurized. The thus generated pressure is admitted to be blown to the outlet opening 33 via outlet port 27, through-holes 30 of cylindrical metal 29, and the inner axial passage 32. When the foot depression is released to return the piston 13 to its illustrated rest position, the pressurized fluid in the wheel brake cylinders or clutch assembly is returned to the bore 12. However, some residual fluid pressure is remained in the wheel brake cylinders or clutch assembly since the tubular rubber 28 closes the through-holes 30. It is understood that such residual fluid pressure is not great to actuate the wheel brake cylinders or clutch assembly.

The present invention mainly resides in connecting means between the housing 11 and a reservoir tank 34 of the master cylinder assembly 10, which will be hereinbelow described.

A body 35 of the reservoir tank 34 is molded from nylon or similar plastic material to contain a working fluid therein. A plastic float 36 is floatingly mounted on the fluid to prevent the objectionable waving of the fluid during operation of the vehicle. A detachable closure cap 37 is mounted on the top of the body 35 thereby closing the opening thereof.

The body 35 comprises a thickened wall portion 38 at its bottom. The thickened wall portion 38 is provided at its center with an opening 39 which can be coaxially located to an opening 40 of the housing 11.

A metallic sleeve 41 having a radially extending flange 42, is integrally associated, preferably by molding, with the opening 39 of the thickened wall portion 38. In the bottom end surface of the thickened wall portion 38 is formed an annular recess 43 within which an annular seal 44 made of rubber material is located for sealing between the housing 11 and the thickened wall portion 38 of the body 35. The annular seal 44 is of an axial thickness, in its unstressed condition, at least equal to or greater than the axial depth of the recess 43.

A bolt 45 having a head 46 and an inner axial passage 47 is passed through the central opening of the sleeve 41 and is meshed with the screw-threads correspondingly provided at the opening, 40 of the housing 11.

The sectional view of the bolt 45 is shown at the right of the line A—A whilst the elevational view thereof is shown at the left of the line A—A in the sole FIGURE.

More specifically, rotation of the bolt 45 causes the fixing of the reservoir body 35 to the master cylinder housing 11 since the metallic sleeve 41 secured to the reservoir body 35 engages the housing of the master cylinder and prevents the excessive deformation of the bottom portion of the reservoir.

It is understood that the axial length of the metallic sleeve 41 is at least equal to or somewhat greater than the axial length of the opening 39 of the thickened wall portion 38 so that the thickened wall portion 38 is not compressed to the degree to undesirably deform it by rotation of the bolt 45, i.e., the tubular sleeve 41 limits the compression of the thickened wall portion 38. However, it is to be noted that the seal (44) is compressed to the predetermined degree necessary to ensure the fluidtight sealing between the reservoir and the housing of the master cylinder. It is also understood that the diameter of the flange 42 is greater than the diameter of the bolt head 46 so that no force of the bolt 45 is applied directly to the thickened wall portion 38 of reservoir body 35. Simultaneously with rotation of the bolt 45, the seal ring 44 is compressed between the thickened wall portion 38 of the body 35 and the housing 11 through the flange 42 of the tubular sleeve 41. It should be recognized that only a relatively small force enough to compress the seal ring 44 is applied to the plastic body 35 of the reservoir tank 34 due to provision of the metallic sleeve 41. The reservoir 34 is thus effectively secured to the housing 11 of the master cylinder assembly 10.

Obviously, many modifications and variations of the above explained embodiment are possible in light of the foregoing teachings. For instance, the flange 42 of the sleeve 41 may be formed into a polygon shape. Such formed flange would prevent the relative rotation of the metallic sleeve 41 with respect to the plastic reservoir body 35, thereby avoiding the possible injury of the seal ring 44 due to the relative rotation of the reservoir 34.

Accordingly, it is understood that the present disclosure has been made only by way of example and that numerous changes may be resorted to without departing from the spirit and the scope of the invention as hereinafter claimed.

We claim:

1. A master cylinder assembly for brakes or clutch system comprising
    a metallic housing provided with an opening and screw-threads on said opening,
    a plastic reservoir including a bottom wall provided with an opening, said opening being located coaxially with said opening in the housing,
    a metallic sleeve having a radial flange made integrally therewith, said sleeve being integrally associated with the opening in the bottom of the reservoir,
    a seal rubber mounted on said bottom wall of plastic reservoir to be interposed between said bottom wall and said housing, and an axial flow passage and
    a bolt having a head to engage said radial flange of sleeve and passed through said sleeve to mesh with said screw-threads on said opening of housing,
    whereby rotation of said bolt causes said plastic reservoir to be secured to said metallic housing and said seal rubber to be compressed between said bottom wall of plastic reservoir and said housing.

2. A master cylinder assembly as set forth in claim 1 wherein an axial length of said sleeve is at least equal to or greater than a depth of said opening of bottom wall so that the compression of said bottom wall is limited when said bolt is rotated to fasten said plastic reservoir to said housing.

3. A master cylinder assembly as set forth in claim 2 wherein said bottom wall is provided at its bottom end with an annular recess within which said seal rubber is located, said seal rubber being of an axial thickness in its unstressed condition at least equal to or greater than an axial depth of said annular recess.

4. A master cylinder assembly as set forth in claim 1 wherein said housing is provided with an outlet port and an outlet bore within which a plug, a tubular rubber, and a cylindrical metal are fitted, said cylindrical metal being provided with a plurality of through-holes which are normally closed by said tubular rubber.

5. A master cylinder assembly as set forth in claim 4 wherein said plug is provided with an inner axial passage and said tubular rubber is fixed to said plug to normally close said through-holes of cylindrical metal whereby said tubular rubber is movable to control fluid pressure communication between said outlet port of housing and said inner axial passage of plug.

6. A master cylinder assembly as set forth in claim 1 wherein said radial flange of metallic sleeve is formed into a polygon shape to thereby prevent rotation of said metallic sleeve with respect to said plastic reservoir.

7. A master cylinder assembly as set forth in claim 1 wherein a diameter of said radial flange of metallic sleeve is greater than that of said head of bolt whereby no force of said screw bolt is applied directly to said bottom wall of plastic reservoir.

8. A master cylinder assembly as set forth in claim 1 wherein said metallic sleeve is molded to said bottom wall of plastic reservoir.

* * * * *